United States Patent
Caldwell et al.

(10) Patent No.: US 9,626,951 B2
(45) Date of Patent: *Apr. 18, 2017

(54) MOUNTING SYSTEM FOR A FISH FINDING DEVICE

(71) Applicants: Alexander J. Caldwell, Aldergrove (CA); Wade G. Van Pelt, Aldergrove (CA)

(72) Inventors: Alexander J. Caldwell, Aldergrove (CA); Wade G. Van Pelt, Aldergrove (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/057,089

(22) Filed: Feb. 29, 2016

(65) Prior Publication Data

US 2016/0180827 A1    Jun. 23, 2016

Related U.S. Application Data

(63) Continuation of application No. 13/678,263, filed on Nov. 15, 2012, now Pat. No. 9,275,623.

(51) Int. Cl.

| G10K 11/00 | (2006.01) |
| A01K 97/00 | (2006.01) |
| G01S 7/56 | (2006.01) |
| G01S 15/96 | (2006.01) |
| B63B 17/00 | (2006.01) |

(52) U.S. Cl.
CPC ............ *G10K 11/006* (2013.01); *A01K 97/00* (2013.01); *G01S 7/56* (2013.01); *G01S 15/96* (2013.01); *B63B 17/00* (2013.01)

(58) Field of Classification Search
CPC .......... G10K 11/006; G01S 7/56; G01S 15/96

USPC ......................................................... 367/173
See application file for complete search history.

(56) References Cited

U.S. PATENT DOCUMENTS

| 2,150,420 A | 3/1939 | Cooper |
| 3,989,213 A | 11/1976 | Allen |
| 4,347,013 A | 8/1982 | Turner |
| 4,624,069 A | 11/1986 | Schneider |
| 4,979,153 A | 12/1990 | Terry |
| 5,142,497 A | 8/1992 | Warrow |
| 5,182,732 A | 1/1993 | Pichowkin |
| 5,190,194 A | 3/1993 | Rosner |
| 5,230,646 A | 7/1993 | Thorup |
| D378,398 S | 3/1997 | Osburn |
| 6,142,839 A | 11/2000 | Wilcox |

(Continued)

FOREIGN PATENT DOCUMENTS

| CA | 2351307 | 12/2002 |
| JP | 4183217 | 11/2008 |

*Primary Examiner* — James Hulka
*Assistant Examiner* — John T Nolan
(74) *Attorney, Agent, or Firm* — Hopkinson Intellectual Property Law; Mark A. Hopkinson (57) ABSTRACT

There is provided a mounting system for a fish finding device to a watercraft which has a support for supporting a fish finding device on a watercraft. The support has a top, a bottom and a peripheral side wall which form a receptacle housing for a battery. Mounting means are positioned at the top of the support to receive a fish finder. Securing means are provided on the bottom of the support for mounting the support to a surface on a watercraft. Mounting means are provided for detachably securing a transducer to a watercraft.

17 Claims, 11 Drawing Sheets

(56) References Cited

U.S. PATENT DOCUMENTS

| | | | |
|---|---|---|---|
| 6,791,902 B1 * | 9/2004 | Steiner | G01S 7/521 |
| | | | 367/111 |
| 6,899,052 B2 | 5/2005 | Nakajima | |
| 7,230,882 B2 | 6/2007 | Swisher | |
| 7,573,229 B2 | 8/2009 | Arakelian | |
| 7,744,046 B1 | 6/2010 | Lundy | |
| 7,746,727 B2 | 6/2010 | Bacarella | |
| 8,739,386 B2 * | 6/2014 | Wein | A24F 15/18 |
| | | | 206/242 |
| 9,275,623 B2 * | 3/2016 | Caldwell | G10K 11/006 |
| 2004/0137321 A1 | 7/2004 | Savaria | |
| 2008/0205048 A1 | 8/2008 | Andrews | |

* cited by examiner

MOUNTING SYSTEM FOR A FISH FINDING DEVICE

CROSS REFERENCE TO RELATED APPLICATIONS

This is a continuation of U.S. patent application Ser. No. 13/678,263 which issued as U.S. Pat. No. 9,275,623 on Mar. 1, 2016.

TECHNICAL FIELD

The present invention relates to mounting systems for fish finding devices.

GOVERNMENT SUPPORT

None.

BACKGROUND

Fish finding devices, or fish finders, are used by both recreational and commercial fishermen to locate fish. Fish finders typically have a viewer, a central processing unit, a power supply and a transducer that transmits and receives sound waves. The sonic waves are directed downward, and when they strike an object they are reflected back and are detected by the transducer. The central processing unit calculates the depth of the object, based on the time it took for the signal to return then displays information about the signal condition which the viewer can then use to determine the location of fish, depth of underlying surfaces or information about other objects in the water.

Typically the central processing unit and display are mounted to the boat in a viewable position. Such mountings can be permanent or detachable. Lead lines are wired from the central processing unit into the boat's existing electrical system to supply power to the central processing unit. The transducers of fish finders are mounted to the transom or the hull of the boat, so that the transducer emits and detects sonar signals when in the water. Transducers can be mounted to the exterior or the interior surface of a hull. Those mounted to the interior surface of a hull emit and detect sonar signals directly through the hull. Depending on the design, users may be required to drill holes through the hull to mount a transducer to the exterior surface of a hall. Suction cups have also been used to stick the transducer to the outer hull.

The positioning of the transducer is essential for accurate readings. The transducer must be below the surface of the water, or in contact with a surface below water level in order to emit and receive the sonar signal proper properly. Ideally the face of transducer should be mounted to point straight down toward the underlying waterbed. Transducers mounted to the inside surface of a hull may experience inaccurate readings while emitting and detecting sonar signals through the hull. Those mounted to the exterior may not be easily accessible or adjustable, and can be vulnerable to damage.

Traditional fish finder and transducer mounts are not easily adapted for use on some types of fishing craft such as the inflatable or float tube variety, where the nature of inflatable craft or float tube makes mounting of the transducer at an accurate angle difficult. Many are permanently secured to a watercraft. Portable fish finder systems have been available for use on float tubes such as that disclosed in U.S. Pat. No. 5,230,646, which teaches the use of a long extension arm for mounting the transducer at a remote end. This places the transducer in an inaccessible position limiting the ability to reposition the transducer easily. The extension arm also makes the transducer vulnerable to damage when moving about as it can collide the obstacles in the water or the bottom of a waterbed.

Fishermen using smaller watercraft such as kayaks, canoes and smaller personal boats where space is limited may also find the use of traditional fish finder and transducer mounts problematic for similar reasons. Moreover, many fish finder devices come with an abundance of cable and lead lines which are difficult to contain and carry on float tubes and smaller watercrafts. Space is very limited on smaller watercrafts such as canoes, kayaks, belly boats and float tubes, and they do not have an existing electronic power supply. As a result, an alternative power source must be carried on the watercraft to power the fish finder.

Due to their placement, transducers can be easily damaged when entering or exiting the water and when moving around obstacles, or simply during transportation of the watercraft.

There is a need for a mounting system which is sufficiently compact and convenient for use on small personal watercraft, and allows for easy and accessible adjustment of the position of the transducer.

SUMMARY OF INVENTION

There is provided a mounting system for a fish finding device to a watercraft which has a support for supporting a fish finding device on a watercraft. The support has a top, a bottom and a peripheral side wall which form a receptacle housing for a battery. Mounting means is positioned at the top of the support to receive a fish finder. Securing means are provided on the bottom for securing the support on a watercraft. Mounting means are also provided for detachably mounting a transducer to a watercraft.

Where the watercraft is an inflated float tube then the securing means includes an adjustable strap which is received through the slotted openings provided in flanges on opposed sides of the bottom of support. The adjustable strap extends through a central opening in the inflated float tube and around the circumference of the tubular body of the inflated float tube to maintain the fish finder in position on the float tube.

The mounting means for detachably securing a transducer to a watercraft is a plate having a coupler adapted to couple with the transducer. The plate has slotted openings on opposed sides of the plate to receive the adjustable strap. The coupler is pivotally mounted such that it pivots on a horizontal axis allowing the transducer to be pivoted relative to the plate. A releasable locking means is provided for releasably locking the transducer in a selected position relative to the plate. The coupler can be rotatably mounted such that the transducer can be rotated on a horizontal axis to point in a selected direction.

Alternatively, where watercraft is a boat, and the mounting means for detachably securing a transducer to a watercraft is one or more paired magnets whereby at least one of the paired magnets can be placed on the inside surface of a hull of the boat and at least one of the other of the paired magnets is secured to one side of a mounting plate for positioning on the exterior surface of the hull. A coupler is provided on the opposed sides of the mounting plate. The coupler is pivotally mounted so that it that pivots on an axis to allow the transducer to be moved relative to the plate. A locking means is provided for locking the transducer in a selected position relative to the plate. The coupler can be rotatably mounted such that the transducer can be rotated to point in a selected direction.

BRIEF DESCRIPTION OF DRAWINGS

In figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A mounting system for mounting a fish finding device to a watercraft, generally identified by reference numeral 10, will now be described with reference to FIGS. 1 through 14.

Structure and Relationship of Parts

Figure 1:
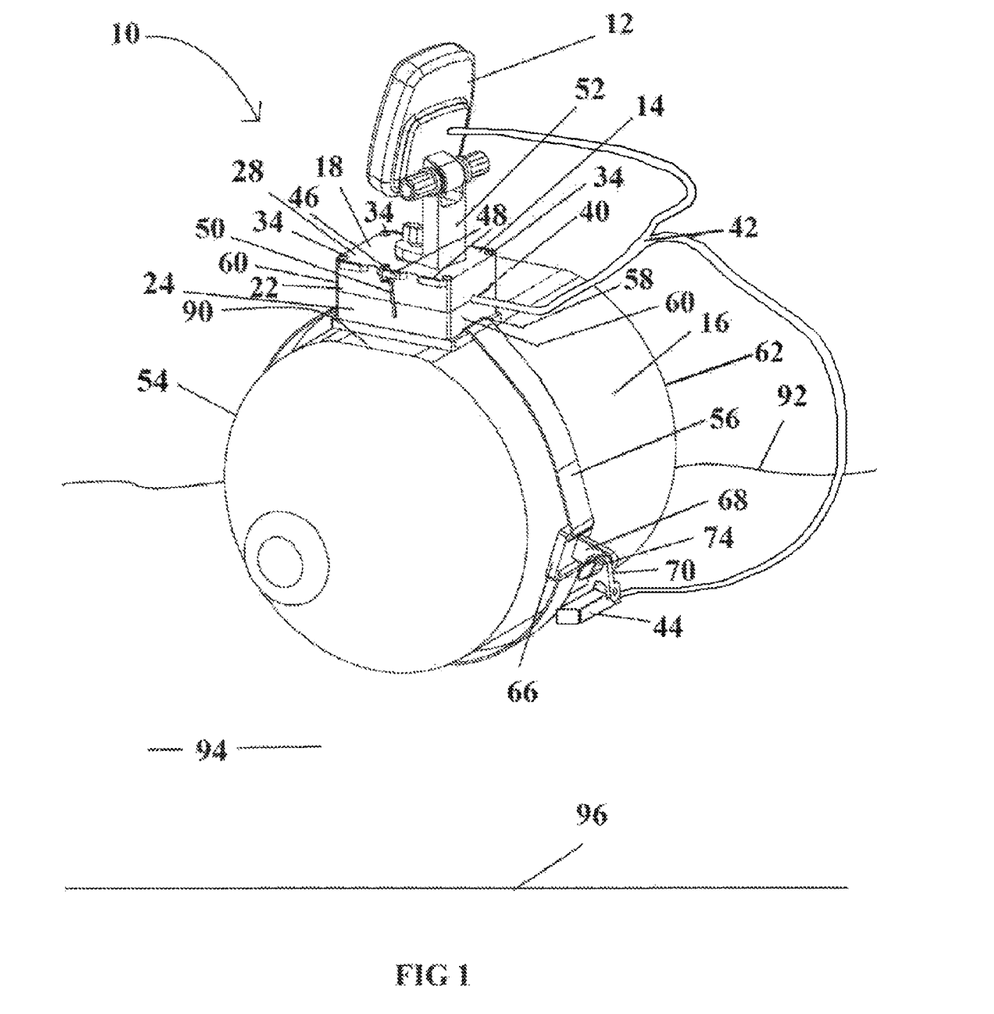
FIG. 1 is a perspective view of a first embodiment of a mounting system mounted on a float tube.
Figure 2:
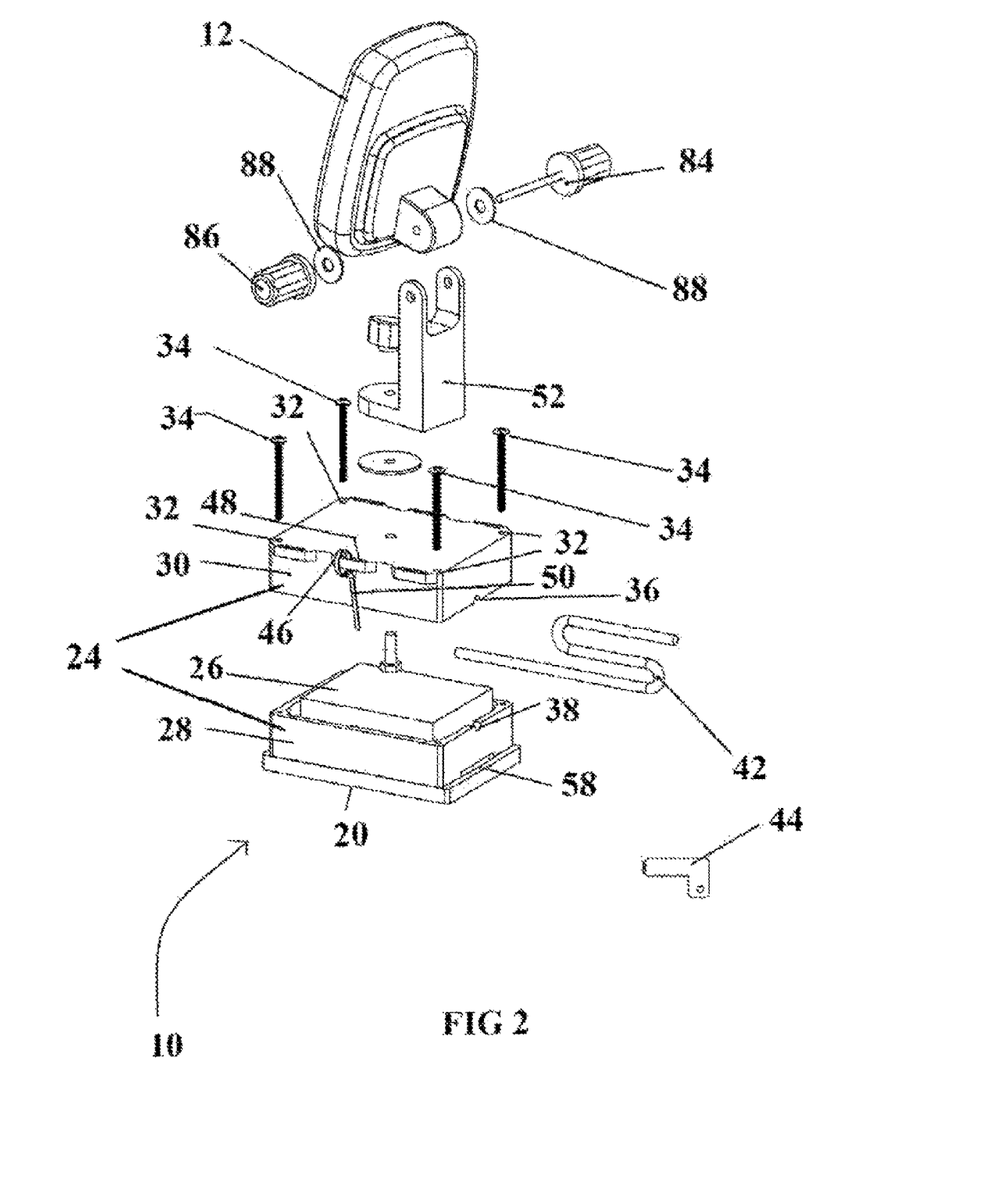
FIG. 2 is an exploded view of the mounting system for a fish finder.

Referring to FIG. 1, there is illustrated an embodiment of a mounting system 10 for mounting a fish finding device generally referenced by numeral 12. Mounting system 10 has a support 14 for supporting a fish finding device 12 on a watercraft 16. Referring to FIGS. 1 and 2, support 14 has a top 18, a bottom 20 and a peripheral side wall 22 which form a receptacle housing 24 for a battery 26 illustrated in FIG. 2.

Referring again to FIG. 2, receptacle housing 24 has a lower portion 28 and an upper portion 30 which are secured together to contain battery 26. In the illustrated embodiment, upper portion 30 has receiving apertures 32 for receiving securing screws 34 for securing upper portion 30 to lower portion 28. Upper portion 30 has a semi-circular opening 36 in sidewall 22 that meets with a semi-circular opening 38 in sidewall 22 on lower portion 28 to form an aperture 40 to accommodate a battery cable 42 as illustrated in FIG. 1.

Referring to FIG. 1, battery cable 42 extends from battery 26 to fish finding device 12 and to a transducer 44 to supply power.

In the illustrated embodiment 10 in FIG. 2, upper portion 30 has flanged portions 46 with slotted openings 48. Standard plastic cables 50 can be threaded through slotted openings 48 and used to secure extra lengths of battery cable 42 to support 14 so that they are contained and out of the way. It will be appreciated that other known types of securing devices such as wires or straps could also be used in place of standard plastic cable 50.

Referring to FIG. 1, an L bracket 52 is positioned at top 18 of support 14 as a mounting means to receive fish finder 12. For the purposes of illustration, L bracket 52 is shown however, fish finders 12 come in a variety of sizes and dimensions, and as such different brackets and mounting means can be used to accommodate a desired fish finder 12 as will be described hereinafter.

Referring to FIG. 1, where watercraft 16 is an inflated float tube 54 then the means of securing support 14 to inflated float tube 54 includes an adjustable strap 56 which is received through slotted openings 58 that provided on opposed sides 60 of lower portion 28 of housing 24. Adjustable strap 56 extends around the circumference of tubular body 62 of inflated float tube 54 to maintain fish finder 12 in an upright and viewable position on float tube 54. In the illustrated embodiment, adjustable strap 56 is a 1.5 inch polypropylene strap although it will be appreciated that other types and dimensions of straps such as plastic or fabric straps can also be used effectively. In the illustrated embodiment, straps 56 are adjustable with a slide buckle (not shown), however other known means of adjusting such as mating tape can also be used.

Figure 3:
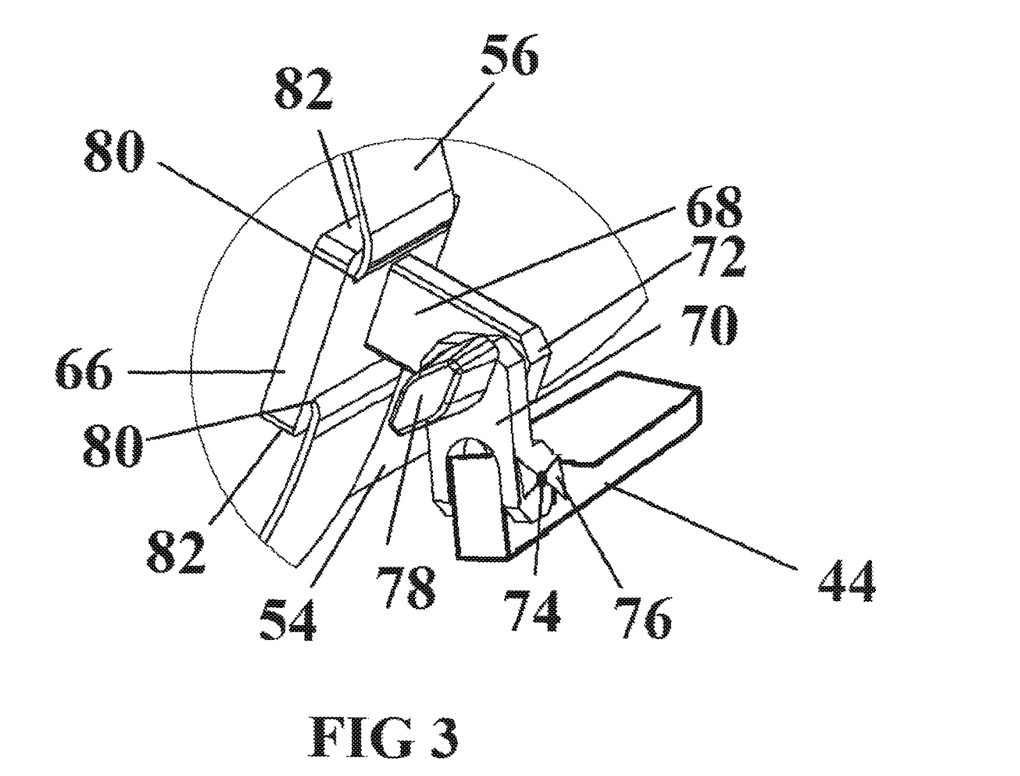
FIG. 3 is a detailed view of the transducer mount illustrated in FIG. 1.
Figure 4:
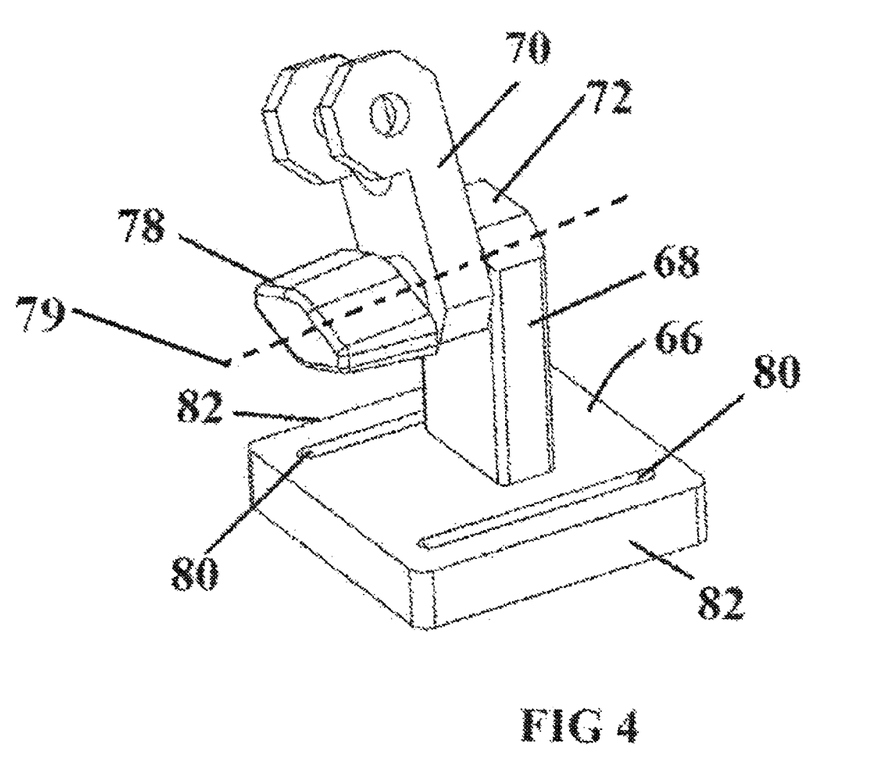
FIG. 4 is a perspective view of the transducer mount illustrated in FIG. 3.
Figure 5:
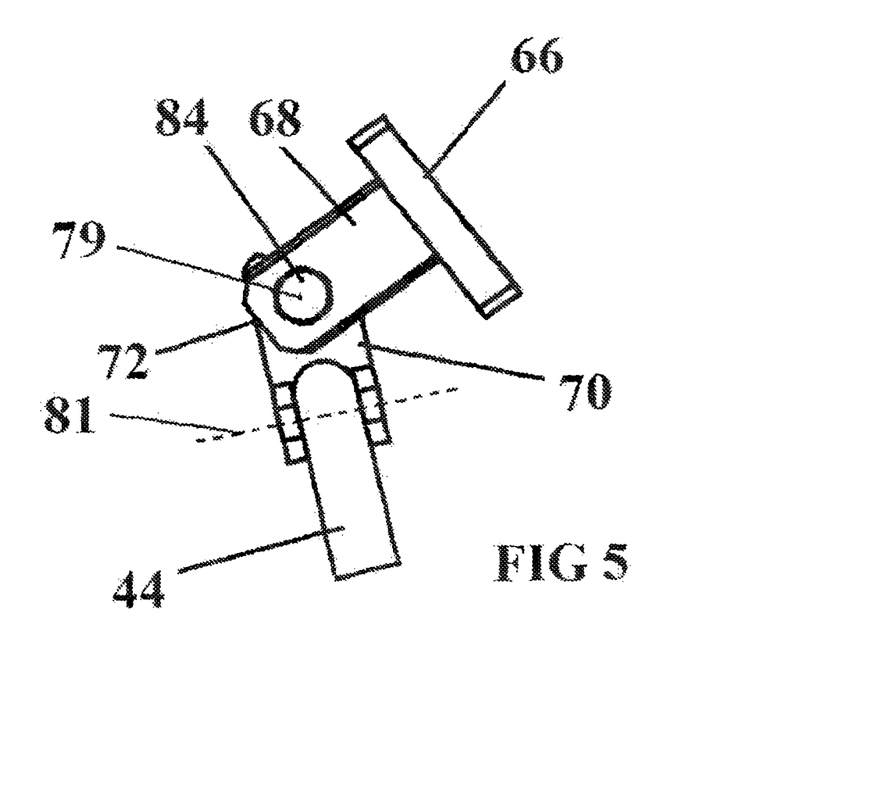
FIG. 5 is a side elevation view of the transducer mount with the transducer pivoted downwards.
Figure 6:
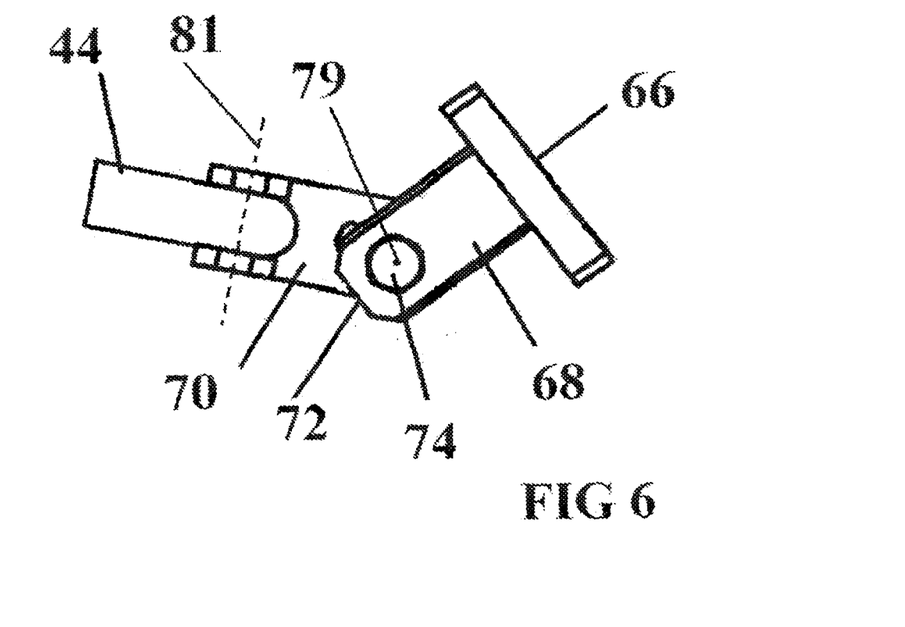
FIG. 6 is a side elevation view of the transducer mount with the transducer pivoted upwards.

Referring again to FIG. 1 and FIGS. 3-6, transducer 44 is detachably secured to float tube 54 by a plate 66 which has an extension 68 that extends outwardly perpendicular to plate 66. Referring to FIG. 4, a coupler 70 is pivotally mounted toward a remote end 72 of extension 68 to rotate about a substantially horizontal axis 79. Transducer 44 is rotatably mounted by a threaded pivot pin 74 and mating butterfly wing nut 76 to coupler 70 as shown in FIG. 3. Referring to FIG. 4, a releasable locking knob 78 is provided for releasably locking coupler 70 and transducer 44 in a selected position relative to plate 66 as illustrated in FIG. 5 and FIG. 6. Locking knob 78 can be loosened to allow coupler 70 to be pivoted about substantially horizontal axis 79 illustrated in FIG. 5 to position transducer 44 relative to plate 66. Coupler 70 can be pivoted so that transducer 44 can be positioned to face downwards as shown in FIG. 5, or coupler 70 can pivoted to position transducer 44 up out of the way has shown in FIG. 6.

Figure 12:
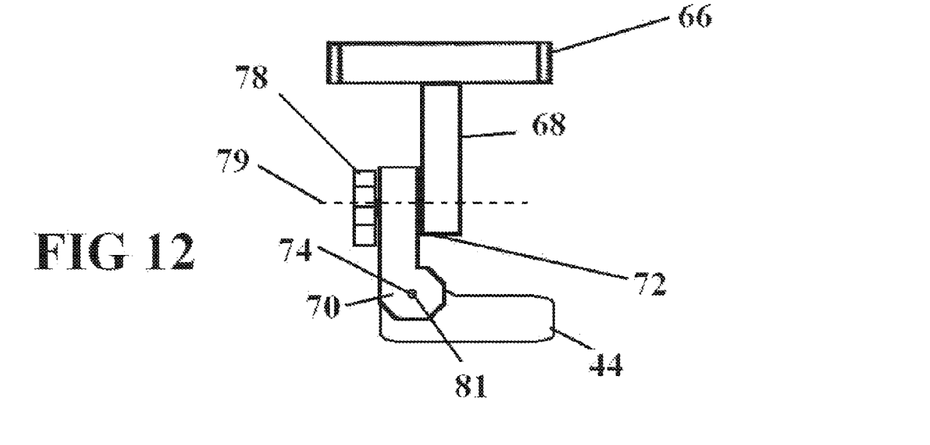
FIG. 12 is a top plan view of the transducer mount illustrated in FIG. 5 rotated to a first position.
Figure 13:
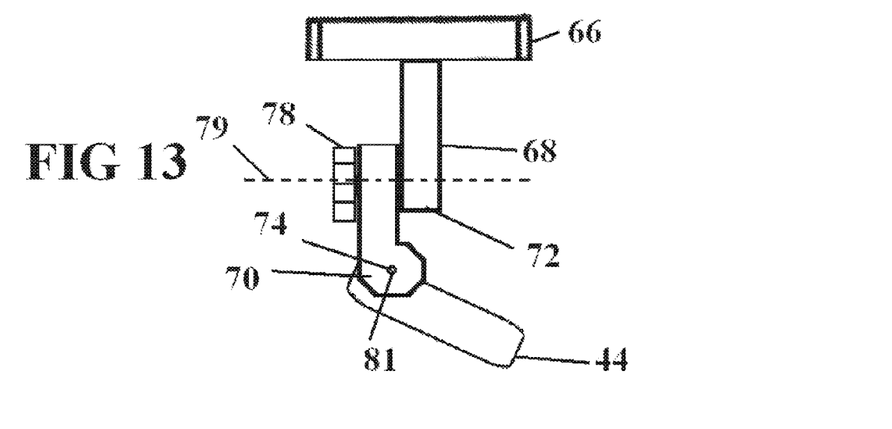
FIG. 13 is a top plan view of the transducer mount illustrated in FIG. 5 rotated to a second position.
Figure 14:
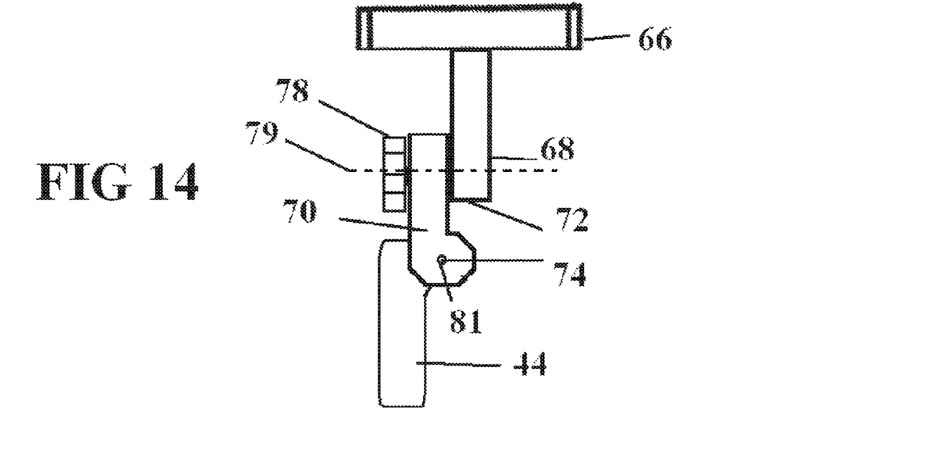
FIG. 14 is a top plan view of the transducer mount illustrated in FIG. 5 rotated to a third position.

Referring to FIG. 3 and FIG. 5, butterfly wing nut 76 can also be loosened so that transducer 44 can be manually rotated about a pivot axis 81 relative to coupler 70 to point in a selected direction as shown in FIG. 12, FIG. 13 and FIG. 14, and then tightened again to maintain transducer 44 in the selected direction. The positioning of transducer 44 can be easily adjusted by manually pivoting coupler 70 relative to plate 66 as illustrated in FIG. 5 and FIG. 6, as well as manually rotating it to point in a desired direction as illustrated in FIG. 12, FIG. 13 and FIG. 14. Referring to FIG. 1, the ability to pivot and rotate transducer 44 allows for the user to adjust the position of transducer 44 to offset any counter angle that may occur when mounting it to curved or irregular surfaces that are common to watercraft 16 to allow for precise aiming of transducer 44.

Referring to FIG. 3, plate 66 has slotted openings 80 on opposed sides 82 to receive the same adjustable strap 56 as support 14. Plate 66 can be positioned anywhere along adjustable strap 56 to allow for ease of access to transducer 44. It is conceivable that two straps 56 can be used whereby support 14 is located on one strap 56 and plate 66 is located on another strap 56. It will also be appreciated that more than one strap 56 could be used to secure fish finder mounting system 10 to float tube 54.

Referring to FIG. 1, while the illustrated embodiment 10 shows fish finder mounting system 10 in use with float tube 54, it will be appreciated that can also be used in conjunction with pontoon boats, belly boats and the like.

Figure 7:
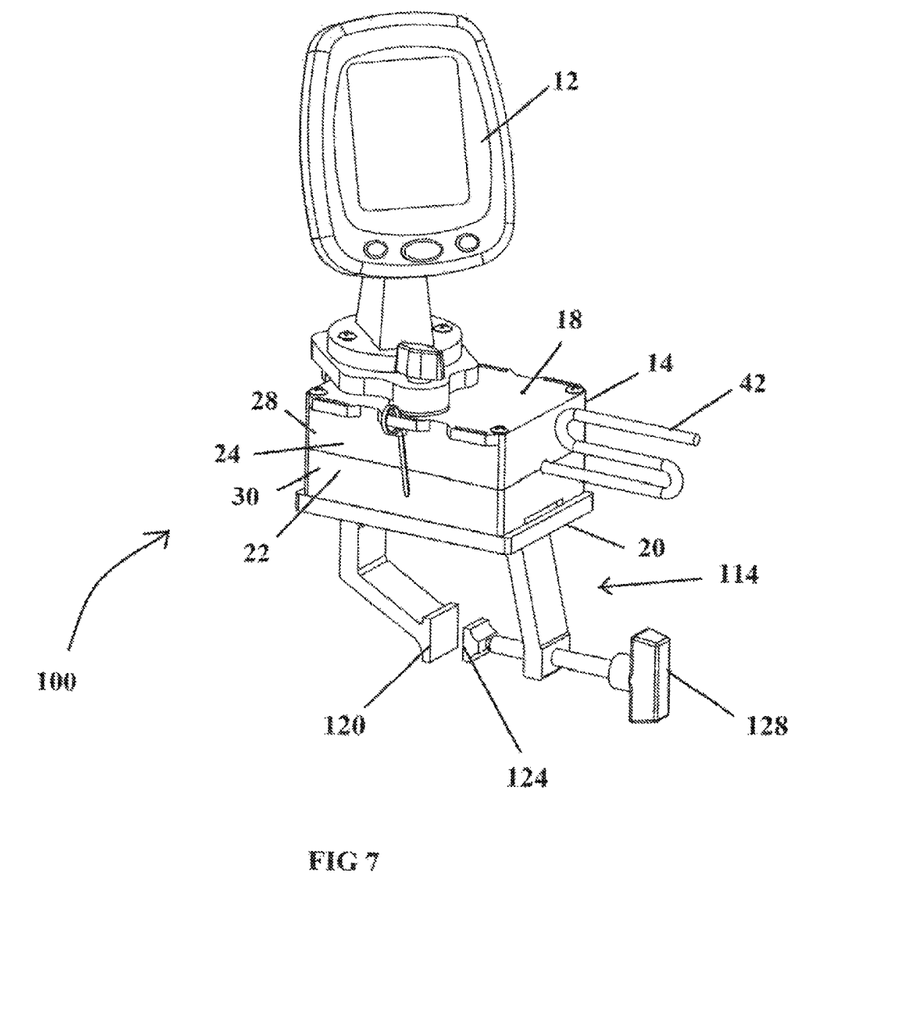
FIG. 7 is a perspective view of a portion of an alternative embodiment of a mounting system.
Figure 8:
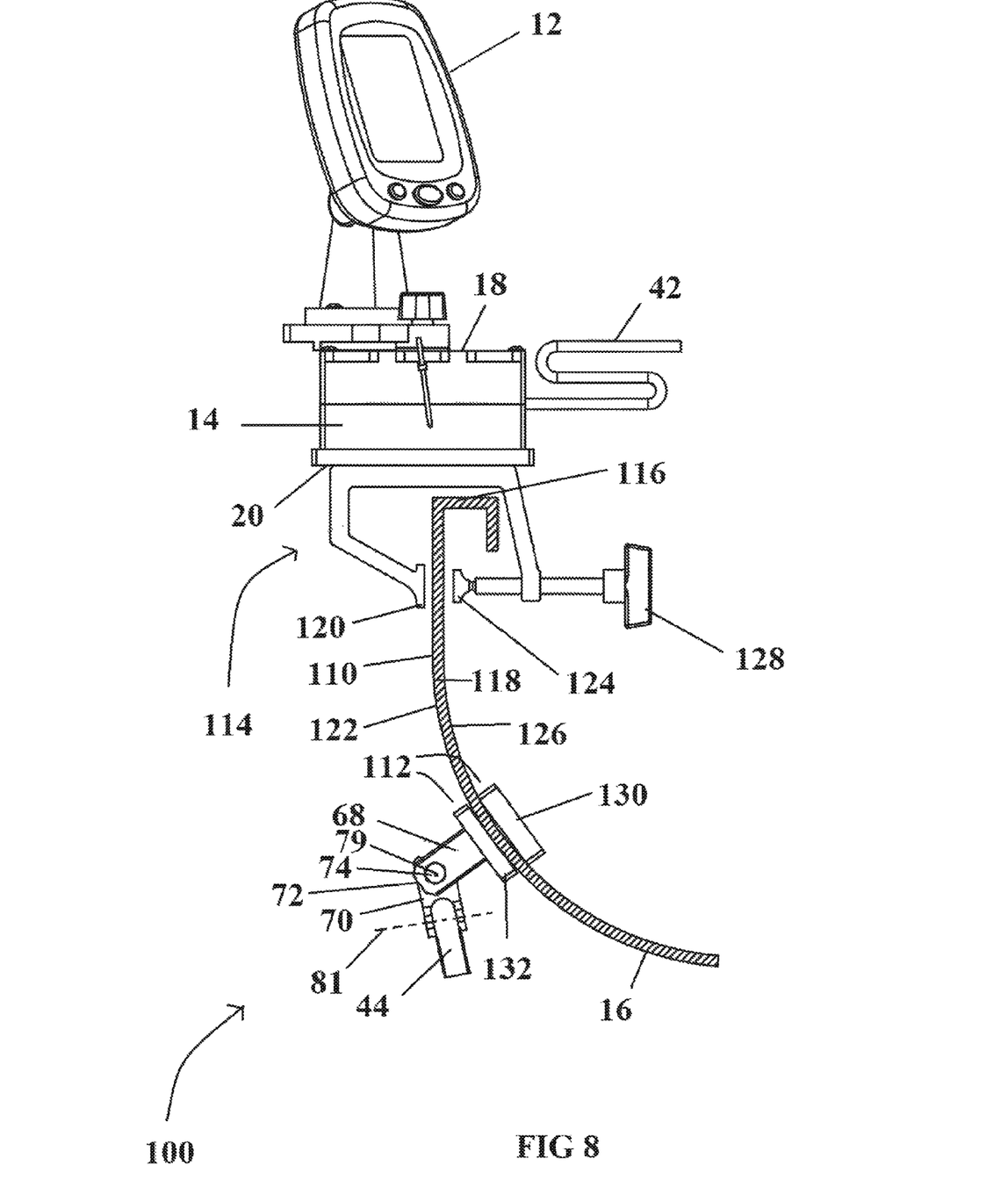
FIG. 8 is a side view of the alternative embodiment of a mounting system mounted on a boat.

Referring to FIG. 7 and FIG. 8, there is illustrated a second embodiment generally referenced by numeral 100 where watercraft 16 is a boat 110, and mounting means for detachably securing the transducer 44 to boat 110 are paired magnets 112. The securing means for securing bottom 20 of support 14 to boat 110 is a gunnel clamp generally referenced by numeral 114.

Referring to FIG. 8, gunnel clamp 114 fits over a peripheral lip 116 on a hull 118 of boat 110. A first clamping surface 120 is positioned on an exterior surface 122 of hull 118, and a second clamping surface 124 is positioned on an interior surface 126 of hull 118. A threaded knob 128 is provided for moving second clamping surface 124 into engagement with interior surface 126 such that hull 118 is firmly clamped between first clamping surface 120 and second clamping surface 124 to secure support 14 in desired position on boat 110.

Figure 9:
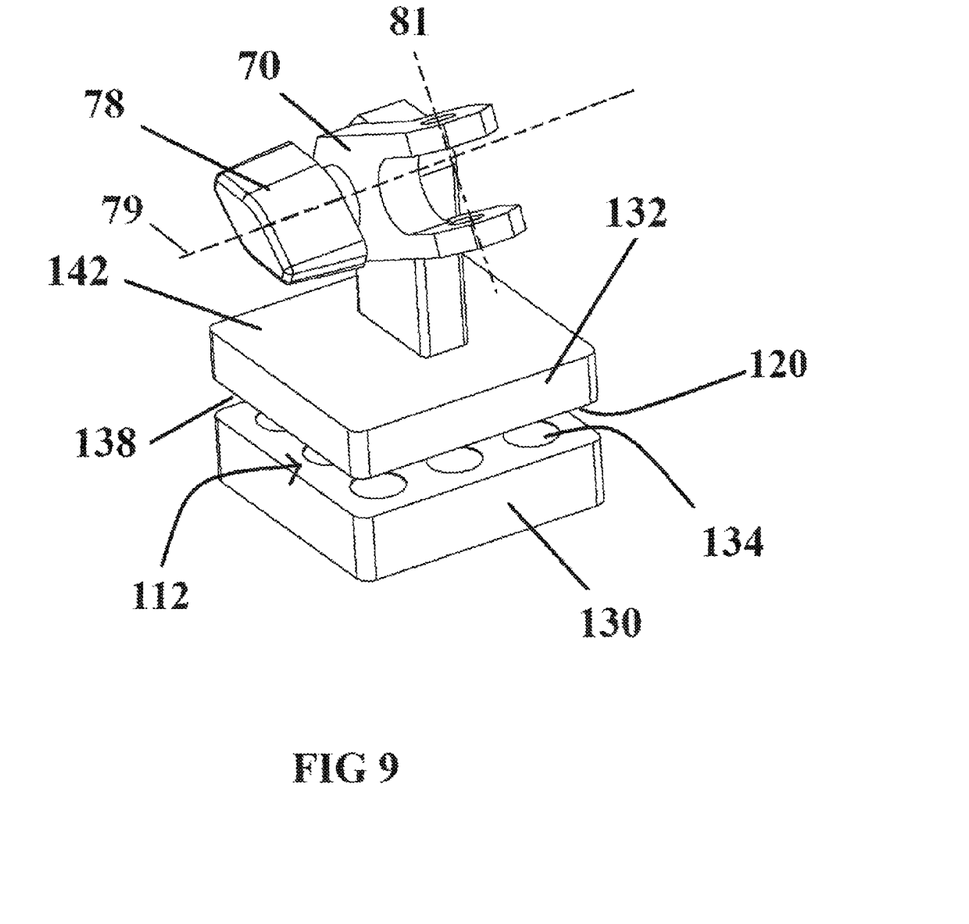
FIG. 9 is perspective view of the transducer mount illustrated in FIG. 8.
Figure 10:
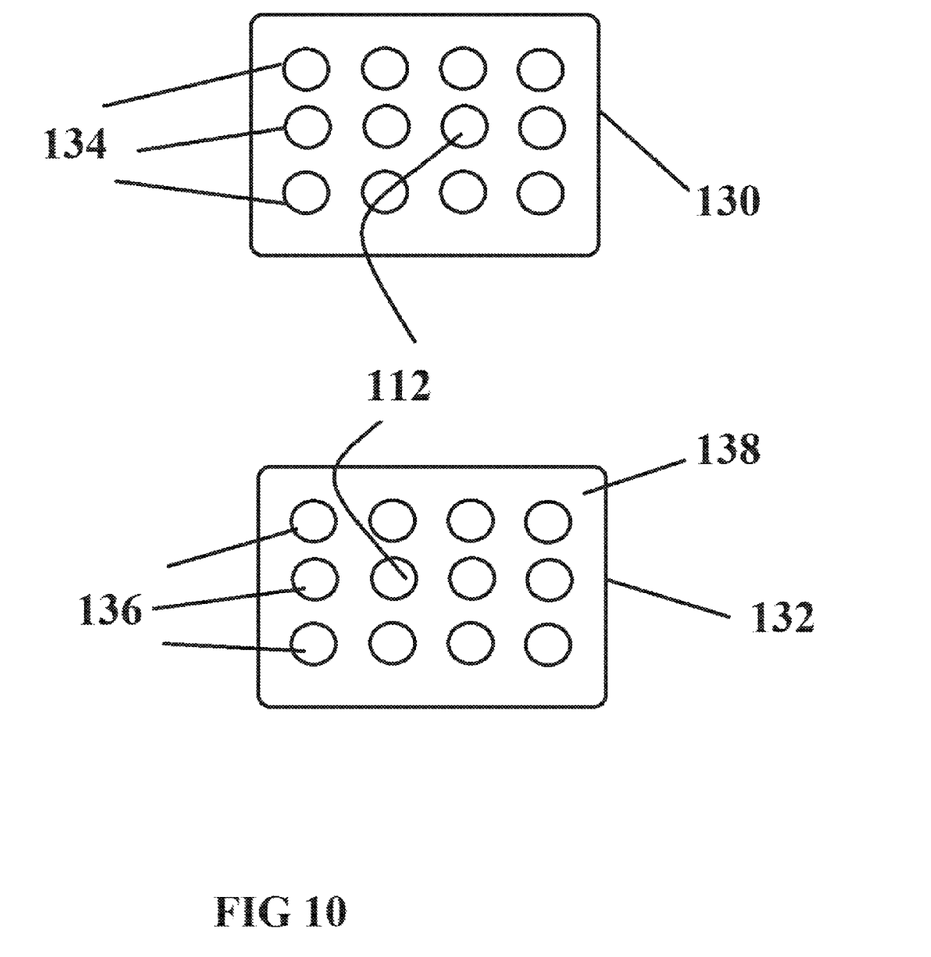
FIG. 10 is a bottom view of the transducer mount illustrated in FIG. 8.

Referring to FIG. 8, in the illustrated embodiment 100, mounting means for detachably securing transducer 44 to boat 110 are paired magnets 112. Referring to FIG. 9, a first plate 130 and a second plate 132 are provided. Referring to FIG. 10, first plate 130 carries one set 134 of the paired magnets 112. Second plate 132 carries the other of set 136 of paired magnets 112 on one side 138 and carries extension 68 with pivotally mounted coupler 70 on an opposed side 142 as shown in FIG. 9. Referring to FIG. 8, transducer 44 is pivotally mounted to coupler 70. As with first embodiment 10, coupler 70 is pivotally mounted to extension 68 to pivot about a substantially horizontal axis 79 such that transducer 44 can be pivoted relative to second plate 132. It will be appreciated that while the illustrated embodiment 100 in FIG. 10 shows a series of paired magnets 112, paired magnets 112 could also be one or more magnets or magnetic strips, or plates 130 and 132 could be magnetic plates.

Referring again to FIG. 8, to mount transducer 44 to watercraft 16, the first plate 130 is placed on interior surface 126 of hull 118 of boat 110 and second plate 132 is placed on exterior surface 122 of hull 118 so that the magnetic pull of paired magnets 112 maintains the transducer 44 in position on hull 118. Referring to FIG. 9, locking knob 78 is provided for locking transducer 44 in a selected position relative to second plate 132 as shown in FIG. 8 in a similar manner as with embodiment 10 illustrated in FIG. 5 and FIG. 6. Referring to FIG. 8 and FIG. 9, coupler 70 is also rotatable about pivot axis 81 so that the transducer 44 can be rotated to point in a selected direction in same manner as embodiment 10 as shown in FIGS. 12-14.

Operation

The use and operation of the mounting systems for a fish finding device will now be described with reference to FIGS. 1 through 14.

Referring to FIGS. 1 and 2, in order to use the mounting system for a fish finding device 10, battery 26 must be placed in receptacle housing 24 and connected to the battery cables 42. Battery cables 42 are then connected to fish finder 12 and transducer 44. Referring to FIG. 2, screws 34 can be threaded though receiving apertures 32 in upper portion 30 to secure upper portion 30 to lower portion 32. Receptacle housing 24 encloses battery 26 to provide protection from water damage. Receptacle housing 24 can be opened to replace or recharge battery 26 as needed. In the illustrated embodiment, the battery is a 12 volt, 2.9 Amp Hour Battery that is rechargeable, however other types of batteries can also be used. In the illustrated embodiment, receptacle housing is approximately 5⅛" wide, 2⅝" high, 3⅝" deep and is dimensioned to allow battery 26 to fit snuggly within. It will be appreciated that receptacle housing could be of other dimensions with an emphasis on being compact. Other compartments could be provided within receptacle housing 24 to hold excess cable 42 or other accessories. It is also envisaged that instead of aperture 40, a connector (not shown) to battery 26 could also be fitted into sidewall 22 such that battery 26 could be plugged in and recharged without removing it from receptacle housing 24. Receptacle housing 24 can be machined from high quality durable plastics or fabricated from other materials.

Referring to FIG. 1, standard plastic ties 50 can be threaded through slotted openings 48 and used to secure excess lengths of cable 42 to support 14 to ensure that they are out of the way. Having battery 26 and cable 42 secured to and within support 14 allows for a compact and contained arrangement suitable for use on small personal watercraft 16 where space and movement are limited.

The compact and contained arrangement is particularly suitable as many users will need to transport the mounting system 10, fish finder 12 and watercraft 16 on foot. It is very common for fishermen to hike into more remote fishing spots and carry mounting system 10, fish finder 12 and watercraft 16. Strap 56 allows for mounting system 10 to be carried by strap 56 and strap 56 can be looped over a users shoulder, leaving his free arms to carry fishing gear and watercraft 16.

Referring to FIG. 1, fish finder 12 can be placed in L bracket 52 that is located at the top 18 of the support 14 to receive fish finder 12. Referring to FIG. 2, in the illustrated embodiment 10, fish finder 12 has threaded locking pin 84 and a locking knob 86 for securing fish finder 12 in L bracket 52. Washers 88 are used with locking pin 84, securing knob 86 and L bracket 52. While L bracket 52 is shown in the embodiment 10 illustrated in FIG. 1 and FIG. 2, a variety of dimensions and styles of brackets can be used including any proprietary mounting brackets that may come with some fish finders 12 at the time of purchase. Bracket 52 can take on a various forms and top 18 of support 14 can be customized to accommodate the mounting bases of different fish finders 12. The ability to adapt to a variety of fish finder designs allows for versatility.

Referring to FIG. 1, adjustable strap 56 is threaded through slotted openings 58 that are provided on opposed sides 60 of the lower portion 28 of housing 24.

Referring to FIG. 3, transducer 44 is pivotally coupled to coupler 70 on plate 66. Releasable locking knob 78 is used to lock the coupler 70 in a selected position relative to the plate 66. Coupler 70 can also be rotatable such that the transducer 44 can point in a selected direction as illustrated in FIG. 12, FIG. 13 and FIG. 14. Referring to FIG. 3, adjustable strap 56 is threaded through slotted openings 80 on opposed sides 82 of plate 66.

Referring to FIG. 1, adjustable strap 56 is placed around the circumference of tubular body 62 of inflated float tube 54 to position fish finder 12 on top 90 of float tube 54 where it is viewable by a user and well above water line 92. Transducer 44 will be positioned on adjustable strap 56 so that it is below water line 92 when float tube 54 is place in water 94.

Referring to FIG. 1 and FIG. 3, releasable locking 78 can be loosened so that the transducer 44 can be manually pivoted about axis 76 upwards relative to the plate 66 as illustrated in FIG. 5 and FIG. 6, to move it out of the way when entering or exiting the water, when moving around obstacles, or during transportation of float tube 54. This reduces the possibility of damaging it during use or during transportation. Transducer 44 can also be manually rotated as illustrated in FIG. 12, FIG. 13 and FIG. 14 to face in a preferred direction for precise and optimal signals.

Referring to FIG. 1, mounting system 10 not only allows a user to mount transducer 44 securely to watercraft 16, but also allows for transducer 44 to be swivelled or tilted approximately 180 degrees. As noted above, the ability to pivot transducer 44 up when entering and emerging from a body of water 94 serves to mitigate damage and minimize wear on the transducer 44. Because transducer 44 is able to be manually pivoted and rotated, the transducer 44 can be installed at a great variety of angles and radius and still be aimed accurately at the water's bottom surface 96. The ability to pivot and rotate the direction of transducer 44 allows for adjustment of the angle transducer 44 faces for precision, as well as providing the ability to offset any counter angle that occurs when mounting system 10 is used in conjunction with float tube 54 or boats 110 with curved surfaces.

Referring to FIG. 2, adaptable brackets such as L bracket 52 allow for varying brands and dimensions of fish finder devices 12 to be installed. If a user wished to switch from one particular fish finder device 12 to another, they could do so easily, with little capital outlay or effort to refit mounting system 10 they already possess.

Referring to FIG. 8, with second embodiment 100, in order to mount transducer 128, first plate 130 is placed on interior surface 126 of hull 118 of boat 110 and second plate 132 is placed on exterior surface 122 of hull 118 so that the magnetic pull of paired magnets 112 maintains transducer 44 in position on hull 118. Referring to FIG. 9, locking knob 78 is provided for locking coupler 70 in a selected position relative to second plate 132. Transducer 44 is also rotatably coupled to coupler 70 so that transducer 44 can be rotated about axis 81 to point in a selected direction in the same manner as first embodiment 10 shown in FIG. 12, FIG. 13 and FIG. 14. First plate 130 and second plate 132 are illustrated as being substantially planar, however first plate 130 and second plate 132 could be curved or have arcuate surfaces to correspond with arcuate surfaces found on interior surface 126 or exterior surface 122 of hull 118 to ensure a flush fit with those surfaces.

With second embodiment 100, mounting of support 14 to boat 110 can be accomplished in a variety of ways. FIG. 7 and FIG. 8 illustrate the use of gunnel clamp 114 to secure support 14 to hull 118 of watercraft 16. It will be appreciated that while this represents one method, there are other known methods of both permanently and detachably securing the support 14 to a watercraft 16.

Referring to FIGS. 1 through 14, mounting systems 10 and 100 allows the user ultimate portability and versatility in setup options while being compact, non-invasive and without damaging watercraft 16. As battery 26 is contained within receptacle housing 24 which also functions as support 14, and excess cables 42 are contained on support 14 the overall system shown in embodiment 10 and embodiment 100 is compact, efficient, and uses minimal space on watercraft 16 while preserving maximum functionality and portability. Furthermore, no drilling, adhesives or permanent alterations are made to a watercraft 16 during installation or use.

Variations

Referring to FIG. 8, while gunnel clamp 114 is illustrated as a means of detachably securing support 14 to boat 110, it will be appreciated that there are other known means for securing support 14 to boat 110. For example, bottom 20 of support 14 can be provided with receiving apertures (not shown) adapted to receive securing bolts (not shown) such that bottom 20 could be bolted to a suitable surface on boat 110. Likewise, mating tape such as Velcro™ could be used to secure support 14 to boat 110.

Figure 11:
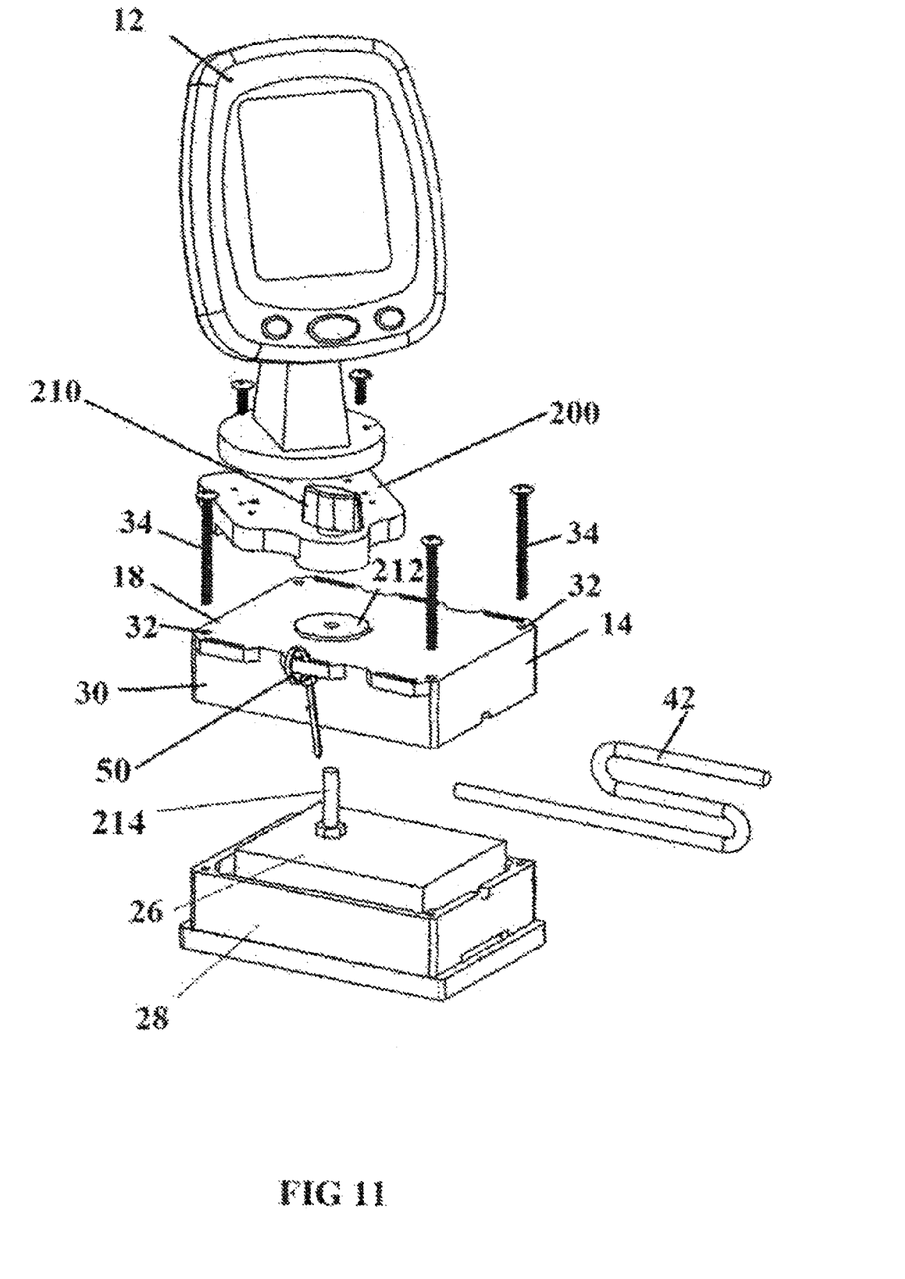
FIG. 11 is a variation illustrating a swivel plate.

Referring to FIG. 11, a swivel plate 200 can be positioned at top 18 of support 14 and fish finder 12 can be mounted directly to swivel plate 200. Swivel plate 200 is then secured to top 18 of support 14 to allow for mounted fish finder 12 to be swivelled about a vertical axis in 360 degrees to a desired position for optimal viewing. A locking knob 210, washer 212 and threaded bolt 214 are provided to secure swivel plate 200 to top 18 of support. Mounting means such as bracket 52 illustrated in FIG. 1 can be used to secure fish finder 12 to swivel plate 200. Referring again to FIG. 11, locking knob 210 is rotated to release swivel plate 200 which can then be swivelled to a desired position whereupon locking knob 210 is then tighten to maintain fish finder 12 that position. Where bracket 52 is an "L" bracket, such as that illustrated in FIG. 2, fish finder 12 can also be tilted by loosening locking knob 86 on threaded locking pin 84 and a tilting fish finder 12 to the desired position. Locking knob 86 is then tightened to secure fish finder 12 at the desired tilt in L bracket 52. Many of the popular compact fish finders which exist on the market do not come with a swivel capability. This limits the ability for the user to optimize their viewing angle when setting up fish finder 12 on their watercraft 16. The ability to swivel and tilt the angle of fish finder allows a user more flexibility and versatility. Referring to FIG. 11, swivel plate 200 and L bracket 52 permit 360 degree rotation and up to 180 degree tilt rotation to provide optimal display positioning for the preferred viewing angle.

While not illustrated, propriety mounting plates that come with some fish finders can also be used as the mounting means for mounting fish finder 12 to top 18 of support 14. Top 18 of support 14 can be adapted to accommodate proprietary mounting brackets and plates.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. Rather the scope of the present invention includes both combinations and sub-combinations of the features described hereinabove as well as modifications and variations thereof which would occur to a person of skill in the art upon reading the foregoing description and which are not in the prior art. It is to be understood that, within the scope of the following claims, the invention may be practiced other than as specifically illustrated and described.

What is claimed is:

1. A mounting system for detachably coupling a transducer to a watercraft, comprising;
   a first magnet of a magnet pair positioned proximate a side surface of a hull of said watercraft;
   a second magnet of said magnet pair positioned proximate an outside surface of said hull, said first and second magnets magnetically couplable to hold said second magnet in position on said hull;
   a coupler coupled to said second magnet; and
   a transducer coupled to said coupler for positioning below a waterline when said watercraft is placed in water;
   wherein said transducer is communicatively coupled to a fish finding display.

2. The mounting system of claim 1 wherein said coupler is pivotally coupled to said second magnet such that said coupler is adjustably and lockably rotatable about a first axis.

3. The mounting system of claim 2 wherein said transducer is pivotally coupled to said coupler such that said transducer is adjustably and lockably rotatable about a second axis.

4. A mounting system for mounting a fish finding system on a watercraft, comprising;
   a support for supporting a fish finding display on said watercraft, said support having a
      top, a bottom and a peripheral side wall which together form a receptacle housing for receiving a battery;
      mounting means coupled to said top of said support for receiving said fish finding display;
      securing means coupled to said bottom of said support for mounting said support to a surface on said watercraft; and
   a transducer detachably coupled to said watercraft, said transducer coupled to said fish finding display.

5. The mounting system of claim 4, wherein detachably coupling said transducer to said watercraft comprises;
   a first magnet of a magnet pair positioned proximate a side surface of a hull of said watercraft;
   a second magnet of said magnet pair positioned proximate an outside surface of said hull, said first and second magnets magnetically couplable to hold said second magnet in position on said hull;
   a coupler coupled to said second magnet; and
   a transducer coupled to said coupler for positioning below a waterline when said watercraft is placed in water.

6. The mounting system of claim 5, wherein said first magnet of said magnet pair is positioned on an inside surface of said hull of said watercraft.

7. The mounting system of claim 5, wherein said first magnet of said magnet pair is positioned on an outside surface of said hull of said watercraft.

8. The mounting system of claim 5, wherein said coupler is pivotally coupled to said second magnet such that said coupler is adjustably and lockably rotatable about a first axis.

9. The mounting system of claim 8 wherein said transducer is pivotally coupled to said coupler such that said transducer is adjustably and lockably rotatable about a second axis.

10. The mounting system of claim 9, wherein locking means is provided for locking said coupler in a selected coupler position.

11. The mounting system of claim 10, wherein said coupler is provided with a rotatable connection for receiving said transducer such that said transducer can be rotated about a second axis.

12. The mounting system of claim 11 wherein said rotatable connection comprises a pivoting pin.

13. The mounting system of claim 11, wherein locking means is provided for locking said transducer in a selected transducer position.

14. The mounting system of claim 4, wherein said watercraft is a boat.

15. The mounting system of claim 13, wherein said watercraft is a boat.

16. The mounting system of claim 13, said fish finding display being rotatably adjustable about a vertical axis on said support and lockably securable on said support.

17. The mounting system of claim 15, said fish finding display being rotatably adjustable about a vertical axis on said support and lockably securable on said support.

* * * * *